United States Patent [19]

Yaotani et al.

[11] 4,438,894
[45] Mar. 27, 1984

[54] HOLDER

[75] Inventors: Koichi Yaotani, Akikawa; Minoru Yoshida, Hachiohji; Seiichi Sato, Yokohama, all of Japan

[73] Assignees: Nissan Motor Corp.; Kato Hatsujyo Kaisha Ltd., both of Kanagawa, Japan

[21] Appl. No.: 291,290

[22] Filed: Aug. 10, 1981

[30] Foreign Application Priority Data

May 15, 1980 [JP] Japan .................. 55-115779

[51] Int. Cl.³ .............................................. F16L 3/08
[52] U.S. Cl. .................................... 248/73; 248/68 R
[58] Field of Search ............. 248/73, 74 R, 74 A, 248/74 B, 74 PB, 68 R, 316 D, 223.4, 225.1, 71, 248/216.4, 217.3

[56] References Cited

U.S. PATENT DOCUMENTS 2,683,578 7/1954 Rainey .................. 248/68 R
2,972,461 2/1961 Balbach et al. .......... 248/73 X
2,990,150 6/1961 Weigel et al. .......... 248/68 R
3,163,712 12/1964 Cochran .................. 248/71 X
3,423,055 1/1969 Fisher ....................... 248/73
4,083,523 4/1978 Fisher ..................... 248/74.3

FOREIGN PATENT DOCUMENTS 1022820 3/1966 United Kingdom ............ 248/73

Primary Examiner—William H. Schultz
Assistant Examiner—Ramon O. Ramirez
Attorney, Agent, or Firm—James & Franklin

[57] ABSTRACT

A holder comprises a base plate having a hooking projection on the inner side of one end thereof, a bent piece bent inwardly of the base plate and integrally connected to the other end of the base plate, and a pressing piece folded into between the bent piece and the base plate and integrally connected to the end of the bent piece. A holding space is formed between the base plate and the pressing piece.

4 Claims, 5 Drawing Figures

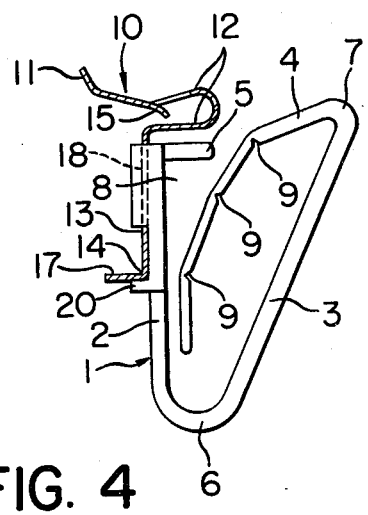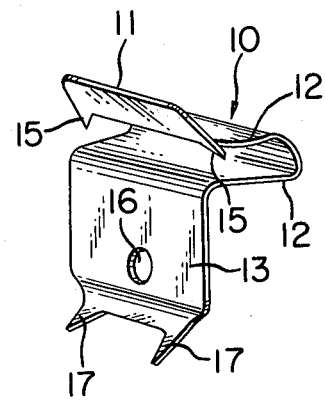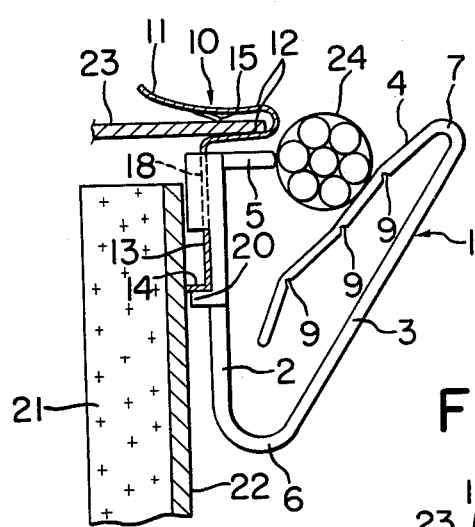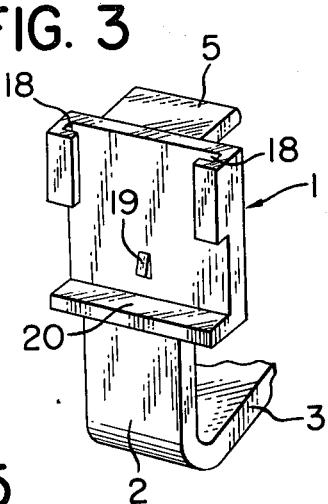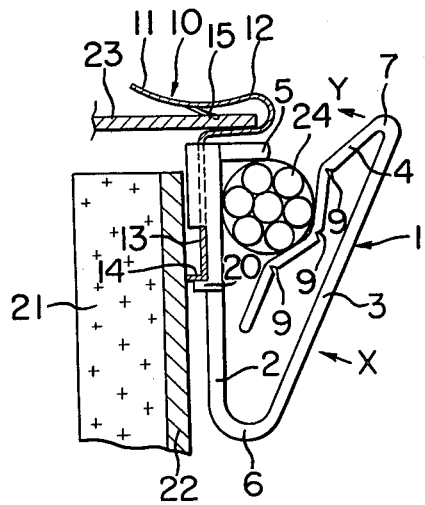

HOLDER

BACKGROUND OF THE INVENTION

1. Field of the Invention

This invention relates to a holder suitable for disposing or mounting various lengthy articles or members at desired locations.

2. Description of the Prior Art

Electric cords, electric cables or the harness thereof are usually disposed at inconspicuous locations such as the upper portions of walls, ceilings or the corners thereof and are held so that the important points thereof do not shift.

The operations in such cases are carried out in unfavorable working environments as described above and, therefore, high utility is required of the holders used for these purposes so that the following requirements may be satisfied.

Holders must originally satisfy various requirements including their ability to hold members to be held (such as harness or the like) so that they do not unreasonably shift, a good working space being ensured in any narrow place and permitting ready mounting or dismounting of the members to be held, a holding function which will not cause damage to the members to be held, and the possibility that a single holder can accommodate various sizes of members to be held. In addition, such holders must satisfy universal requirements such as simplicity of structure, ease of manufacture and low cost of manufacture.

Considering the prior art holders from such a viewpoint, the holders using a shrouding ring or screws to directly attach the members to be held to a wall surface cannot provide a good working space in narrow places and often cause damages to be imparted to the members to be held.

On the other hand, resilient metal fittings (holders) having a U-shaped or like cross section adapted to be attached to a wall surface and into which the members to be held are forced so as to be held satisfy the requirements concerning the structure, manufacture and cost. But if the resiliency (spring force) of the holders is intensified, the above-described operation of forcing the members to be held into the holders becomes difficult to carry out and may also damage the members to be held and, conversely, if the resiliency of the holders is weakened, there will occur a problem that the members to be held which have been fitted into the interior of the holders shift. In addition, a single holder of such type cannot accommodate various sizes of members to be held.

SUMMARY OF THE INVENTION

It is an object of the present invention to solve the above-noted problems and to provide a holder which satisfies the aforementioned requirements.

The holder of the present invention mainly comprises a base plate having a hooking projection on the inner side of one end thereof, a bent piece bent inwardly of the base plate and integrally connected to the other end of the base plate, and a pressing piece folded between the bent piece and the base plate and integrally connected to the end of the bent piece, a holding space being formed between the base plate and the pressing piece.

The invention will become fully apparent from the following detailed description of an embodiment thereof taken in conjunction with the accompanying drawings.

BRIEF DESCRIPTION OF THE DRAWINGS

FIG. 1 is a front view showing an embodiment of the holder and fitting according to the present invention.

FIG. 2 is a perspective view of the fitting adapted for use with the holder.

FIG. 3 is a perspective view showing the outer side surface of the holder.

FIGS. 4 and 5 are front views showing the holder (with fitting) as it is used.

DESCRIPTION OF THE PREFERRED EMBODIMENT

Referring to FIG. 1, reference numeral 1 designates a holder made of plastic. The holder 1 may alternatively be made of a resilient metal in some cases.

The holder 1 comprises chiefly a base plate 2, a bent piece 3 and a pressing piece 4.

The base plate 2 has a hooking projection 5 on the inner side of one end thereof and the bent piece 3 is integrally connected to the base plate 2 through a bent portion 6. The base plate 2 and the bent piece 3 form therebetween a V-shaped angle smaller than 90°.

The pressing piece 4 is integrally connected to the end of the bent piece 3 through a bent portion 7, and is folded into between the base plate 2 and the bent piece 3.

A holding space 8 is formed between the base plate 2 and the pressing piece 4, and in the pressing piece 4, as shown, a plurality of hinge portions 9, 9, 9 for making the pressing piece 4 bendable are formed by concave grooves.

The holder 1 may be attached to a desired location by securing the base plate 2 by means of screws or an adhesive agent, but in the illustrated embodiment, as an example, a fitting 10 of metal which will hereinafter be described is combined with the holder.

While the relative structure of the fitting 10 and holder 1 may partly be understood from FIG. 1, it is more particularly shown in FIGS. 2 and 3 and so the relative structure of the holder 1 and fitting 10 will be described by referring to these figures.

The fitting 10 shown in FIG. 2 comprises a mounting portion 12 having an upwardly warped end portion 11 and bend bent into an inverted U-shape, a flat plate portion 13 extending downwardly from the mounting portion 12, and an abutting portion 14 outwardly bent from the lower end of the flat plate portion 13. The mounting portion 12 is formed with detent pieces 15, 15, the flat plate portion 13 is formed with a hooking aperture 16, and the abutting portion 14 is formed with penetrating pieces 17, 17.

On the other hand, the base plate 2 of the holder 1 shown in FIG. 3 has, on the opposite side edges of the outer surface thereof, a pair of slide fitting grooves 18, 18 corresponding to the width of the flat plate portion 13. A hooking projection 19 corresponding to the hooking aperture 16 and a receiving portion 20 accommodating with the abutting portion 14 are provided on the outer surface of the base plate 2.

When the holder 1 and the fitting 10 are combined together into the condition shown in FIG. 1, the flat plate portion 13 of the fitting 10 is fitted into the slide fitting grooves 18, 18 of the holder 1, the hooking projection 19 and hooking aperture 16 are hooked relative to each other and the abutting portion 14 comes into abutment with the receiving portion 20. When such condition has been brought about, usually the fitting 10 cannot become disengaged from the holder 1 because the hooking projection 19 has to shape of a detent.

The holder 1 with the fitting 10 thus combined therewith will be attached to the interior of an automotive vehicle, for example.

Referring to FIGS. 4 and 5 which show an example of such attachment, reference numeral 21 designates an adiabatic, sound-intercepting insulator lying at the boundary between an engine room and a passenger compartment, reference numeral 22 denotes a decorative plate secured to that side of the insulator 21 which is adjacent to the passenger compartment, and reference numeral 23 designates a dash panel.

The fitting 10 may be mounted in position by causing the mounting portion 12 having the detent pieces 15, 15 to hold the dash panel 23 and causing the penetrating pieces 17, 17 of the abutting portion 14 to penetrate into the decorative plate 22, and the holder 1 may be secured in position through the intermediary of the fitting 10.

Usually, a plurality of holders 1 are mounted at predetermined intervals in the manner described above, and a member 24 to be held (such as harness or the like) is held by being received in the holding space 8 within each of such holders 1.

This will further be described with reference to FIGS. 4 and 5. In FIG. 4, when the member 24 to be held is inserted into the holding space 8 within the holder 1, the base plate 2 and the bent piece 3 interconnected by the bent portion 6 are expanded relative to each other, and the bent piece 3 and the pressing piece 4 interconnected by the bent portion 7 are folded toward each other, and in this condition, the member 24 to be held enters into the holding space 8.

In the condition of FIG. 5 wherein the member 24 to be held has thus entered into the holding space 8, a force in the direction of arrow X is created in the bent piece 3 through the force of restitution of the bent portion 6 while, at the same time, a force in the direction of arrow Y is created in the pressing piece 4 through the force of restitution of the bent portion 7. The member 24 to be held is urged against the base plate 2 and its hooking projection 5 under these forces, so that the member 24 to be held is held by the base plate 2, the hooking projection 5, the pressing piece 4, etc.

In this case, the pressing piece 4 is bent and deformed by virtue of the hinge portions 9, 9, 9 so as to cover part of the outer periphery of the member 24 to be held, thus enhancing the holding effect.

Thus, with the above-described construction of the holder of the present invention in which the base plate has a hooking projection on the inner side of one end thereof and an inwardly bent piece is integrally connected to the other end of the base plate and a pressing piece (folded into between the bent piece and the base plate) is integrally connected to the end of the bent piece so as to form a holding space between the base plate and the pressing piece, when a member to be held is inserted into or removed from the holding space of the holder, the bent configuration by the base plate, the bent piece and the pressing piece may be simply deformed and, even though the holder has been mounted at a narrow place, the above-described operation can be simply accomplished and the working property can be secured sufficiently.

Also, the member to be held in the holding space is held by the base plate, its hooking projection and the pressing piece and, in this condition, a two-stage spring force provided by the two bent portions acts to prevent the member being held from shifting unreasonably and, moreover, the member 24 being held, which is in a resiliently held condition, may be relieved of any influence of vibration or extraneous impact and can never be damaged.

Further, the holding space of the holder has its internal volume contractible or expansible by variations in the angle of bent portion between the base plate and the bent piece and the angle of bent portion between the bent piece and the pressing piece. Accordingly, the holding space can hold therein members of various sizes to be held within its tolerance and, as a result, a single holder can accommodate members of various sizes to be held.

Also, the holder, which comprises a relative bent structure of base plate, bent piece and pressing piece can be simply manufactured either by plastic molding or by metal molding and offers no problem of increased cost or complicated structure.

In the embodiment illustrated herein, the hinge portions formed in the pressing piece can enhance the holding effect.

We claim:

1. A fitting to be used in combination with a holder comprising a base plate having a hooking projection on the inner side of one end thereof, a bent piece bent inwardly of said base plate and integrally connected to the other end of said base plate, and a pressing piece folded into between said bent piece and said base plate and integrally connected to the end of said bent piece, a holding space being formed between said base plate and said pressing piece, said fitting comprising a mounting portion having an upwardly warped end portion bent into an inverted U-shape, a flat plate portion extending downwardly from the mounting portion and an abutting portion outwardly bent from the lower end of the flat plate portion.

2. The fitting of claim 1 for mounting to a surface a holder for automatically immobilizing an article inserted therein in combination with a holder comprising (A) a base plate having a plate defining a substantially planar inner side and a hooking projection on the inner side of one end thereof;

(B) a bent piece bent inwardly of said base plate and integrally connected at one end to the other end of said base plate; and (C) a pressing piece folded into between said bent piece and said base plate, integrally connected to the other end of said bent piece, and extending a substantial length of the distance from said other end of said bent piece to the connection of said bent piece one end and said base plate other end; said pressing piece defining with said base plate a holding space formed therebetween for holding articles inserted in said holding space; said pressing piece being comprised of bendable hinge portions, spacing the articles inserted into said holding space from said bent piece, and being configured and dimensioned such that insertion of an article of appropriate dimensions into said holding space bends at least one of said hinge portions and causes the article to become immobilized between said pressing piece and said plate and hooking projection of said base plate, thereby to foreclose accidental retreat of the article from said holding space, without any separate manual closure of said holder.

3. The holder of claim 2 wherein said immobilized article is in direct physical abutting contact with said pressing piece and said plate and hooking projection of said base plate.

4. The holder of claim 2 wherein said pressing piece is devoid of any acute bends prior to insertion of the article into said holder.

* * * * *